United States Patent [19]

Beckerer, Jr.

[11] Patent Number: 5,031,564
[45] Date of Patent: Jul. 16, 1991

[54] SNUBBER STRIP

[76] Inventor: Frank S. Beckerer, Jr., 40 Dock Rd., Milford, Conn. 06460

[21] Appl. No.: 450,532

[22] Filed: Dec. 14, 1989

[51] Int. Cl.⁵ .................... B63B 59/02; E02B 3/26
[52] U.S. Cl. ............................. 114/219; 405/212
[58] Field of Search ............ 114/219; 52/716; 405/212, 215; 267/139, 140; 293/136

[56] References Cited

U.S. PATENT DOCUMENTS

| | | | |
|---|---|---|---|
| 2,935,855 | 5/1960 | Reid | 114/219 X |
| 3,667,071 | 6/1972 | Hoch et al. | 52/716 |
| 3,949,697 | 4/1976 | Ueda | 114/219 |
| 3,961,593 | 6/1976 | Matthews | 114/219 |
| 4,428,568 | 1/1984 | McNatt et al. | 293/136 X |

FOREIGN PATENT DOCUMENTS 647886  10/1962  Italy .................... 114/219

*Primary Examiner*—Sherman Basinger
*Attorney, Agent, or Firm*—H. Gibner Lehmann; K. Gibner Lehmann

[57] ABSTRACT

The invention involves a snubber strip and mooring dock construction as used for boats and the like. The snubber strip is constituted of a molded rubber or plastic extrusion having an elongate hollow body portion with one flat wall that forms its inner side. The body portion has attachment flange portions one of which is coplanar with the flat side and the other of which is perpendicular to the flat side. The perpendicular flange portion has a depending lip along its free edge and is so constituted as to overlie a structural beam member with its lip on one side of the member and with the flat wall of the body portion on the other side of the member in a close fit.

2 Claims, 2 Drawing Sheets

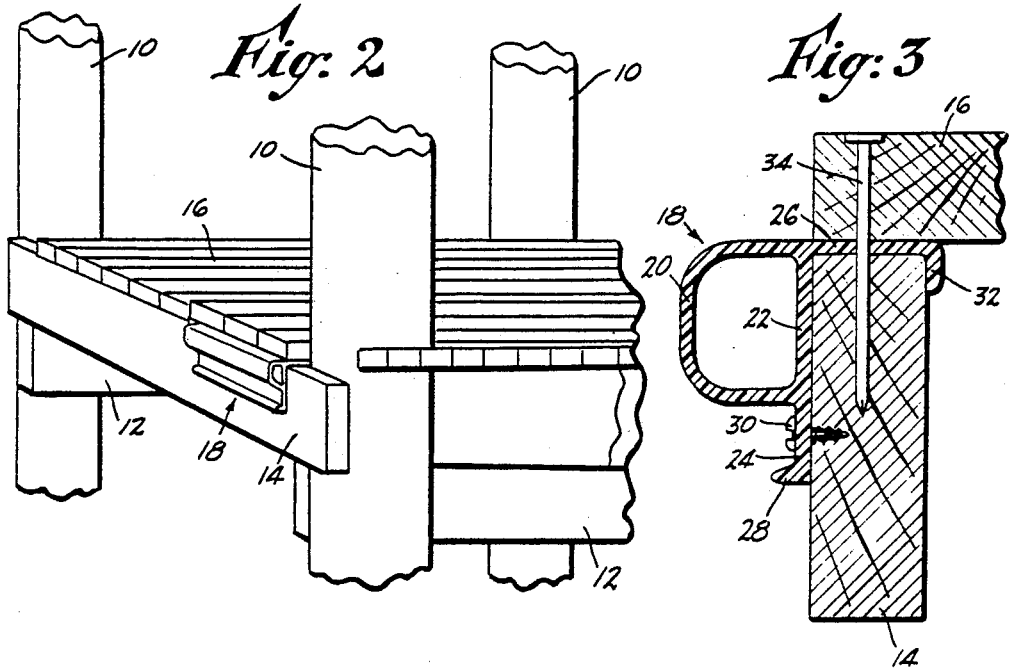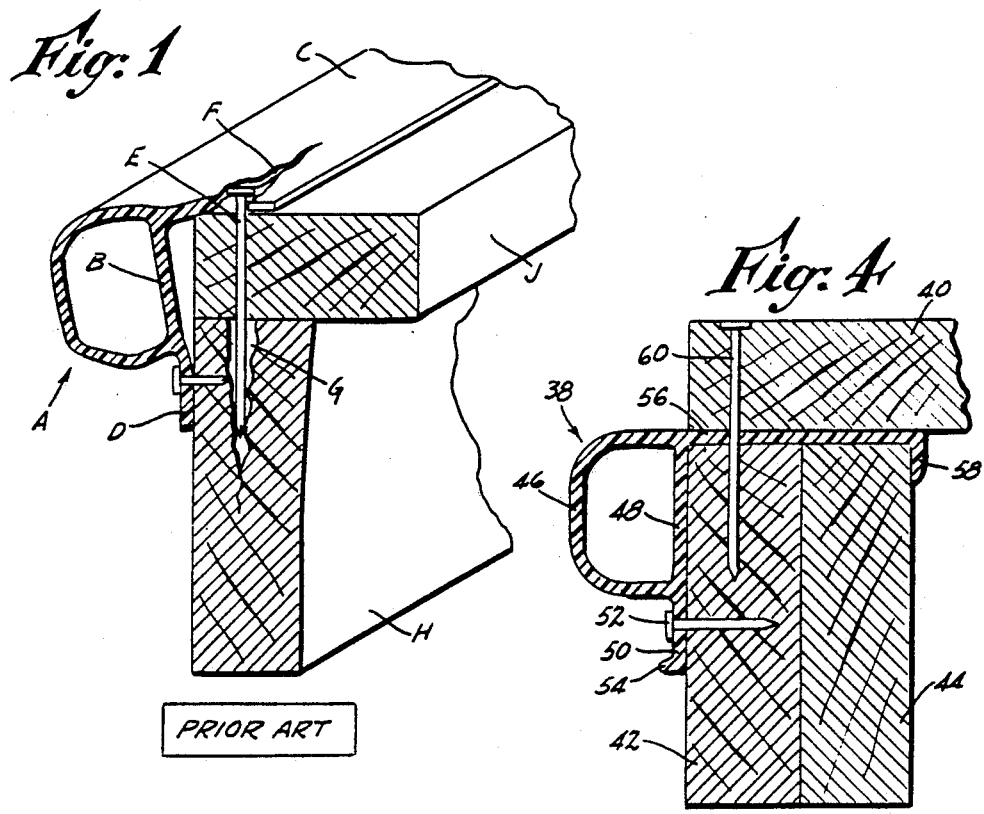

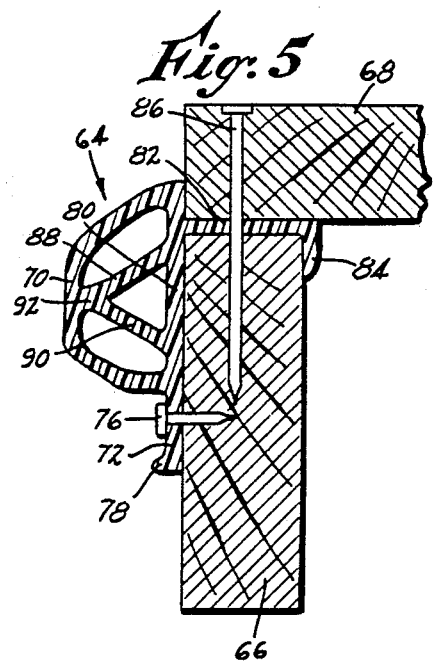
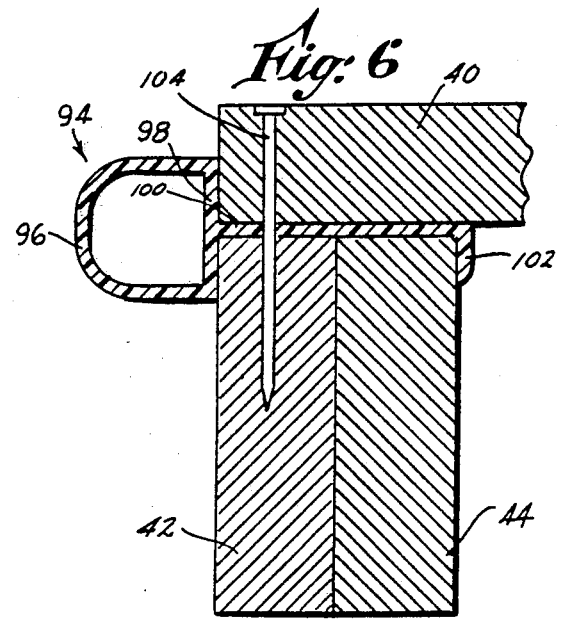
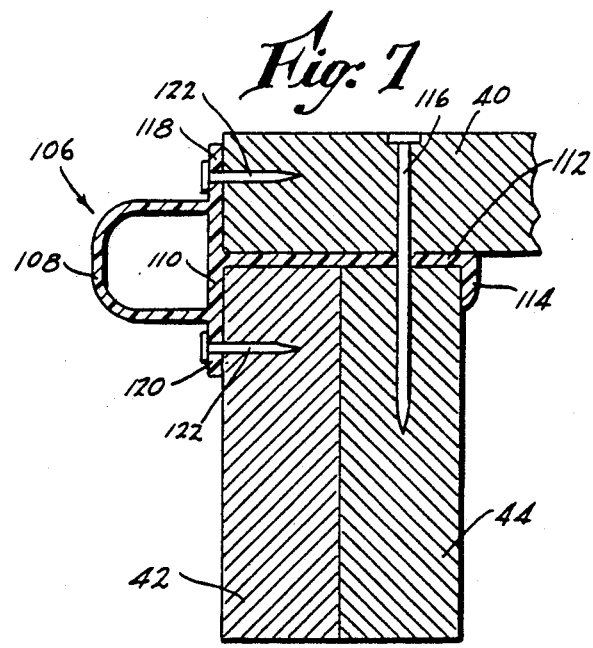

SNUBBER STRIP

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

BACKGROUND OF THE INVENTION

1. Field of the Invention

This invention relates to snubber strips such as are used at boat docks, boat moorings etc. for the purpose of engaging the hull of a boat to prevent scraping and damage thereto.

2. Description of the Related Art Including Information Disclosed Under 37 CFR §§1.97-1.99

A prior snubber strip consisted of a resilient elongate hollow body portion having a substantially flat elongate wall which formed the inner side wall of the body portion. Integral and coextensive with the flat wall were two elongate attachment flange portions, one being substantially coplanar with said flat wall and the other being substantially perpendicular thereto, thereby forming an internal elongate corner into which the external corner of the dock or wharf was intended to be fitted. The body portion was then attached along the dock corner by means of nails or spikes which were driven through the flanges and into the top plank or other wood of the dock.

This construction has a number of disadvantages. For one thing, the head of the spike which is driven through the top or perpendicular flange of the snubber strip tends to unduly imbed itself into the soft material of the flange and eventually cause a rupture or tear of the same, especially if the snubber strip is subject to strong pulling or rubbing forces at or near the point of attachment. Also, the said spike can cause splitting of the treated or coated beam or stringer member which supports the top corner plank of the deck of the wharf or dock.

The prior snubber strip was intended to overlie the crack that is formed where the end floor plank rests on the end stringer or beam of the dock, ostensibly to provide a shield for preventing water from entering such crack and forming a basis for rot or deterioration. However, the inner portions of the crack at the location under the dock were not closed or sealed, and therefore water has access to the crack and could collect therein to cause ultimate rotting. This was especially likely to occur if the beam had been split by the spike or nail that was driven in to secure the snubber.

In each of these circumstances, water and ice are likely to work in and collect at the deformed or split parts, ultimately causing deterioration and rotting or failure thereof.

SUMMARY OF THE INVENTION

The above disadvantages and drawbacks of this prior snubber strip are obviated by the present invention, and one object of the invention is to provide an improved snubber strip of the type indicated, which is not likely to split or to be damaged during its installation, as when it is secured by nailing.

Another object of the invention is to provide an improved snubber strip as above set forth, which acts to effectively seal the adjoining wooden parts of the dock or wharf.

A further object of the invention is to provide an improved snubber strip in accordance with the foregoing, which is especially simple in construction and economical to fabricate.

A feature of the invention involves the provision of an improved snubber strip as characterized, which is effective in its action, and rugged and durable to enable it to withstand hard usage.

A still further object of the invention is to provide an improved snubber strip as described above, which tends to minimize the likelihood of splitting of the floor beam or beams at the time of its installation.

Another feature of the invention is the provision of an improved snubber strip, which readily lends itself to production of different sizes or shapes, thereby to accommodate single or else multiple end-beam constructions.

In accomplishing the above objects the invention provides a snubber strip preferably formed as a soft or yieldable extruded rubber or plastic structure, comprising a resilient elongate hollow body portion having a substantially flat elongate wall forming the inner side wall of the body portion.

The extruded strip has a pair of exterior elongate attachment flange portions which are integral and substantially coextensive with said flat wall, one of said flange portions being substantially perpendicular to said flat wall whereas the other flange portion is substantially coplanar with said flat wall. The perpendicular flange portion has an elongate depending lip along its free edge whereby said lip and flat wall define between them a space for receiving a portion of the structural beam or stringer member of the dock.

The perpendicular flange portion also can have various widths, thereby to accommodate single or else multiple or laminated beam members of a dock.

Other features and advantages will hereinafter appear.

BRIEF DESCRIPTION OF THE DRAWINGS

FIG. 1 is a vertical section of a dock edge and prior snubber strip, illustrating defects encountered during installation of the prior-art strip.

FIG. 2 is a fragmentary perspective view of a portion of a dock or wharf having installed thereon a short length of improved snubber strip made according to the invention.

FIG. 3 is a vertical section of an edge portion of a dock, having the improved snubber strip installed thereon as provided by the present invention.

FIG. 4 is a vertical section somewhat similar to that of FIG. 3 but illustrating a modification of the invention.

FIG. 5 is a vertical section similar to the sections of FIGS. 3 and 4 but illustrating a still further modification of the invention.

FIG. 6 is a vertical section similar to the sections of FIGS. 3 and 4 but illustrating another modification of the invention, and FIG. 7 is a vertical section similar to the sections of FIGS. 3 and 4 but illustrating still another modification of the invention.

DESCRIPTION OF THE PREFERRED EMBODIMENT

FIG. 1 illustrates a deteriorated condition of a dock and attached snubber strip of prior design. During installation of the snubber strip, careless nailing has resulted in the topmost attachment flange being mashed and cracked, thereby admitting water to collect under the snubber and between it and the end plank of the deck. Also, the end beam has been split, due in part to its lack of confinement or support at the nailing area.

This prior snubber strip comprises a hollow body portion A having a flat inner wall B provided with attachment flanges C and D, the latter being coplanar with the wall B and the flange C being perpendicular to the the wall B. The nail E has been driven in too far, mashing portions of the flange C and forming a crack F therein. The nail E has caused a split G in the beam H on which the floor plank J rests.

In FIG. 2 a typical dock construction is shown, having upright posts or piles 10, horizontal floor beams or stringers 12 and 14, and floor planks 16. As seen in FIGS. 2 and 3, the floor planks 16 are sufficiently long to enable them to overlap the end beam 14 and rest above the same.

In FIG. 2 a short length of snubber strip 18 of the type as provided by the invention has been installed on the dock. A vertical section of the snubber strip 18 is shown in FIG. 3, as applied to the single beam 14 and under a plurality of the floor planks 16.

The snubber strip 18 comprises a resilient elongate hollow body portion 20 having a substantially flat elongate wall 22 forming the inner side wall of the body portion. The strip 18 has a pair of exterior elongate attachment flange portions 24 and 26 which are integral and substantially coextensive with the flat wall 24.

One attachment flange portion 24 is substantially coplanar with the flat wall 22 whereas the other attachment flange portion 26 is substantially perpendicular to the flat wall 24.

According to the invention, the attachment flange 24 has, along its bottom edge, a strengthening bead 28 which tends to prevent splitting of the flange when it is attached to the beam member 14, as by the screws 30 which are of corrosion-resistant metal. Further, in accordance with the invention, the perpendicular flange 26 is provided, along its inner edge, with a depending lip 32 which is adapted to snugly engage the upper inner surface of the beam 14. The spacing between the lip 32 and the flat wall 22 is such that the upper edge portion of the beam 14 snugly fits therebetween, so as to effect a seal therewith. The wall 22 and inner surface of the lip 32 thus form substantially parallel, opposed surfaces which define between them a well-defined clearance space for engaging the opposite faces of the beam 14.

According to the invention the floor plank 16 rests on top of the flange 26, and a nail or spike 34 is driven through the plank, through the flange 26 and into the beam 14.

With such construction, the weight of the plank 16 on the flange 26, which latter is of soft or resilient material, results in a tight fit and seal, taking up any unevenness especially as the nail is driven home. Also, the softness of the snubber strip results in its taking up unevenness of the beam 14 whereby water is prevented from entering and collecting at these areas.

Additionally, the confinement of the upper portion of the beam 14 by the wall 22 and lip 32 of the snubber strip tends to prevent the beam from splitting when the nail 34 is driven in. It should be noted that the upper flange 26 is confined along its entire length between the beam 14 and the planks 16 making up the deck of the dock, and that no localized mashing of the upper flange 26 can occur due to driving in of the nails 34.

Another embodiment of the invention is illustrated in FIG. 4, wherein the improved snubber strip is designated generally by the numeral 38. In this figure, floor planks 40 are placed to overlie a pair of beams or stringers 42., 44 which can be secured in side-by-side relation by any suitable means. The snubber strip 38 comprises a body portion 46 having a flat wall 48 and a depending coplanar flange 50 that is secured to the beam 42 by a nail 52. The flange 50 has a strengthening bead 54 along its bottom edge, as with the previous embodiment of the invention.

For spanning the beams 42 and 44, the strip 38 has a wide top flange 56 provided with a depending lip 58 whereby the upper portions of the beams are snugly enclosed and sealed against the entrance of water. The flange 56 is interposed between the beams 42 and 44 on the one hand, and the floor planks 40 on the other hand, being compressed thereby to make watertight joints. A nail 60 is shown as driven through the floor plank 40, flange 56 and into the outermost beam 42. The advantages of the construction of FIG. 3 are also had with the construction of FIG. 4.

Still another embodiment of the invention is illustrated in FIG. 5, wherein an improved snubber strip 64 is shown as attached to a beam 66 and floor plank 68. The snubber strip 64 has a hollow body portion 70 provided with a depending coplanar attachment flange 72 secured to the beam member 66 by a nail 76. The flange 72 has a bead 78 to strengthen it, as with the preceding embodiments of the invention.

The body portion 70 has an inner flat wall 80 from which there extends, in a horizontal direction, the upper perpendicular attachment flange 82 having a depending lip 84.

A nail 86 secures the floor plank 68 and flange 82 to the upper portion of the beam 66.

In accordance with the invention, the body portion 70 is reinforced by a V-section web having angularly disposed legs 88 and 90 which meet at an apex 92 that is centrally joined to the outermost wall of the body portion. The legs 88 and 90 provide a desirable reinforcement of the body portion, enabling it to withstand greater forces without failure.

Yet another embodiment of the invention is illustrated in FIG. 6, showing an improved snubber strip designated 94. The strip has a hollow body portion 96 with a flat elongate inner wall 98. By the invention, a single elongate attachment flange portion 100 is provided, being integrally formed with the body portion 96, located near or at the centerline of wall 98, and having along its innermost edge a depending lip 102. As in FIG. 4, the flange portion 100 is interposed between beams 42 and 44 on the one hand, and the floor planks 40 on the other hand, being compressed thereby to effect watertight joints therewith. A nail 104 extends through the plank 40 and flange portion 100, and into the beam 42. The advantages of the constructions illustrated in FIGS. 3, 4 and 5 are similarly had with the construction of FIG. 6.

A further embodiment of the invention is illustrated in FIG. 7, showing a modified snubber strip 106 having a hollow body portion 108 with a flat elongate inner wall 110. Again, a single elongate attachment flange portion 112 is provided, having along its innermost edge a depending lip 114. The flange portion 112 is interposed between the beams 42 and 44 and the floor planks 40. A nail 116 extends through the plank 40 and flange portion 112 and into the beam 44.

Further in accordance with the invention there are provided a pair of elongate side flanges 118, 120 extending along and integrally molded with the body portion 108 of the strip. These are secured by nails 122 driven into the floor plank 40 and beam 42 respectively. Multiple nails extend through the side flanges 118, 120 at desired intervals, in order to provide added strength and stability to the body portion 108 and also to prevent distortion thereof, or undesirable shifting of the strip under repeated impacts as are typically encountered. As in the case of FIG. 6, the flange is 112 is preferably located at or near the centerline of the inner wall 110.

The constructions illustrated in FIGS. 6 and 7 are characterized by extreme simplicity, while retaining the required reliability and ruggedness under the harsh conditions that typify marine environments.

It will now be seen from the foregoing that I have provided improved, simple and economical-to-fabricate snubber strips which serve to protect the dock portions to which it is attached, while at the same time being more rugged and durable, and able to withstand increased forces without failure or malfunction. The snubber in each instance tends to minimize splitting of the wood members to which it is attached, and to minimize rotting and other water damage such as characterize conventional snubber installations.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. An edge construction for a platform of the type having a structural beam member disposed generally horizontally with its side surfaces located generally in vertical planes, and a floor plank having an edge portion overlying and supported by said beam member, said edge construction comprising in combination:
    (a) a snubber strip comprising a resilient elongate hollow body portion having a substantially flat elongate wall forming an inner side wall of the body portion, said strip having a pair of exterior elongate attachment flange portions which are integral and substantially coextensive with said flat wall, one of said flange portions being substantially perpendicular to said flat wall for interposition between said floor plank and beam member, the other flange portion being substantially coplanar with said flat wall, said one flange portion having an elongate depending lip along its free edge, said lip and flat wall defining between them a space which a portion of said structural beam member can occupy,
    (b) said side wall of the snubber strip being engageable with an outer side surface of the beam member, and
    (c) securing means extending through the floor plank and perpendicular flange portion and into the beam member.

2. An edge construction for a platform of the type having a structural beam member disposed generally horizontally with its side surfaces located generally in vertical planes, and a floor plank having an edge portion overlying and supported by said beam member, said edge construction comprising in combination:
    (a) a snubber strip comprising a resilient elongate hollow body portion having a substantially flat elongate wall forming an inner side wall of the body portion, said strip having an exterior elongate attachment flange portion which is integral and substantially coextensive with said flat wall, said flange portion being substantially perpendicular to said flat wall for interposition between said floor plank and beam member, said flange portion having an elongate depending lip along its free edge, said lip and flat wall defining between them a space which a portion of said structural beam member can occupy,
    (b) said side wall of the snubber strip being engageable with an outer side surface of the beam member, and
    (c) securing means extending through the floor plank and flange portion and into the beam member.

* * * * *